(12) United States Patent
Taga

(10) Patent No.: US 10,390,657 B2
(45) Date of Patent: Aug. 27, 2019

(54) GRID FOR COOKING FOOD

(71) Applicant: SMEG S.p.A., Guastalla (IT)

(72) Inventor: Bujar Taga, Guastalla (IT)

(73) Assignee: SMEG S.p.A. (IT)

( * ) Notice: Subject to any disclaimer, the term of this patent is extended or adjusted under 35 U.S.C. 154(b) by 240 days.

(21) Appl. No.: 15/485,564

(22) Filed: Apr. 12, 2017

(65) Prior Publication Data

US 2017/0295995 A1 Oct. 19, 2017

(30) Foreign Application Priority Data

Apr. 13, 2016 (IT) .................. 102016000038179

(51) Int. Cl.
*A47J 37/07* (2006.01)
*A47J 37/06* (2006.01)
*F24B 3/00* (2006.01)

(52) U.S. Cl.
CPC ......... *A47J 37/0786* (2013.01); *A47J 37/067* (2013.01); *F24B 3/00* (2013.01); *A47J 37/0704* (2013.01)

(58) Field of Classification Search
CPC ............... A47J 37/06; A47J 37/07; F24B 3/00
USPC ................................ 126/25 R, 41 R; 99/445
See application file for complete search history.

(56) References Cited

U.S. PATENT DOCUMENTS

| | | | |
|---|---|---|---|
| 4,428,281 A * | 1/1984 | Miller | A47J 37/067 99/445 |
| 4,598,634 A * | 7/1986 | Van Horn, II | A47J 37/067 99/340 |
| 5,105,725 A | 4/1992 | Haglund | |
| 7,146,906 B2 * | 12/2006 | Kuran | A47J 37/067 99/445 |
| 2006/0180137 A1 * | 8/2006 | McDonald | A47J 37/0713 126/25 R |

(Continued)

FOREIGN PATENT DOCUMENTS

| | | |
|---|---|---|
| DE | 187660 | 10/1906 |
| DE | 4244629 A1 | 8/1993 |

(Continued)

OTHER PUBLICATIONS

Corresponding Italian Search Report dated Dec. 15, 2016.
Australian Examination Report No. 2 dated Oct. 16, 2018.

*Primary Examiner* — Gregory L Huson
*Assistant Examiner* — Nikhil P Mashruwala
(74) *Attorney, Agent, or Firm* — The Belles Group, P.C.

(57) ABSTRACT

A grid for cooking food, in particular for equipping a barbecue; the grid comprising a plate which has an upper face, configured for being set in contact with the food, and a lower face, configured for facing a heat source; the upper face comprising a plurality of channels parallel to one another and configured for conveying liquids; each channel being separated from the adjacent channel by a partition; the plate comprising a plurality of through openings for enabling the hot air and the combustion fumes produced by the heat source to lap the food; wherein the openings are provided at the portions of connection of two adjacent channels with the corresponding partition so as to provide paths for the hot air and combustion fumes that have an inlet on the lower face and two lateral outlets towards two adjacent channels.

20 Claims, 3 Drawing Sheets

(56) References Cited

U.S. PATENT DOCUMENTS

| | | | | |
|---|---|---|---|---|
| 2012/0222665 A1* | 9/2012 | Ahmed | ............... | A47J 37/0694 |
| | | | | 126/25 R |
| 2014/0144333 A1* | 5/2014 | Ahmed | ............... | A47J 37/0786 |
| | | | | 99/445 |
| 2015/0312964 A1* | 10/2015 | Sorenson | ............. | A47J 37/0611 |
| | | | | 219/448.13 |

FOREIGN PATENT DOCUMENTS

| | | |
|---|---|---|
| DE | 4212681 | 10/1993 |
| DE | 4212681 A1 | 10/1993 |
| DE | 4236773 | 5/1994 |

\* cited by examiner

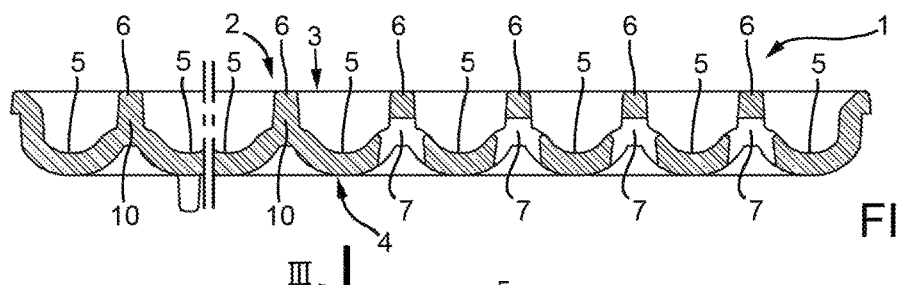
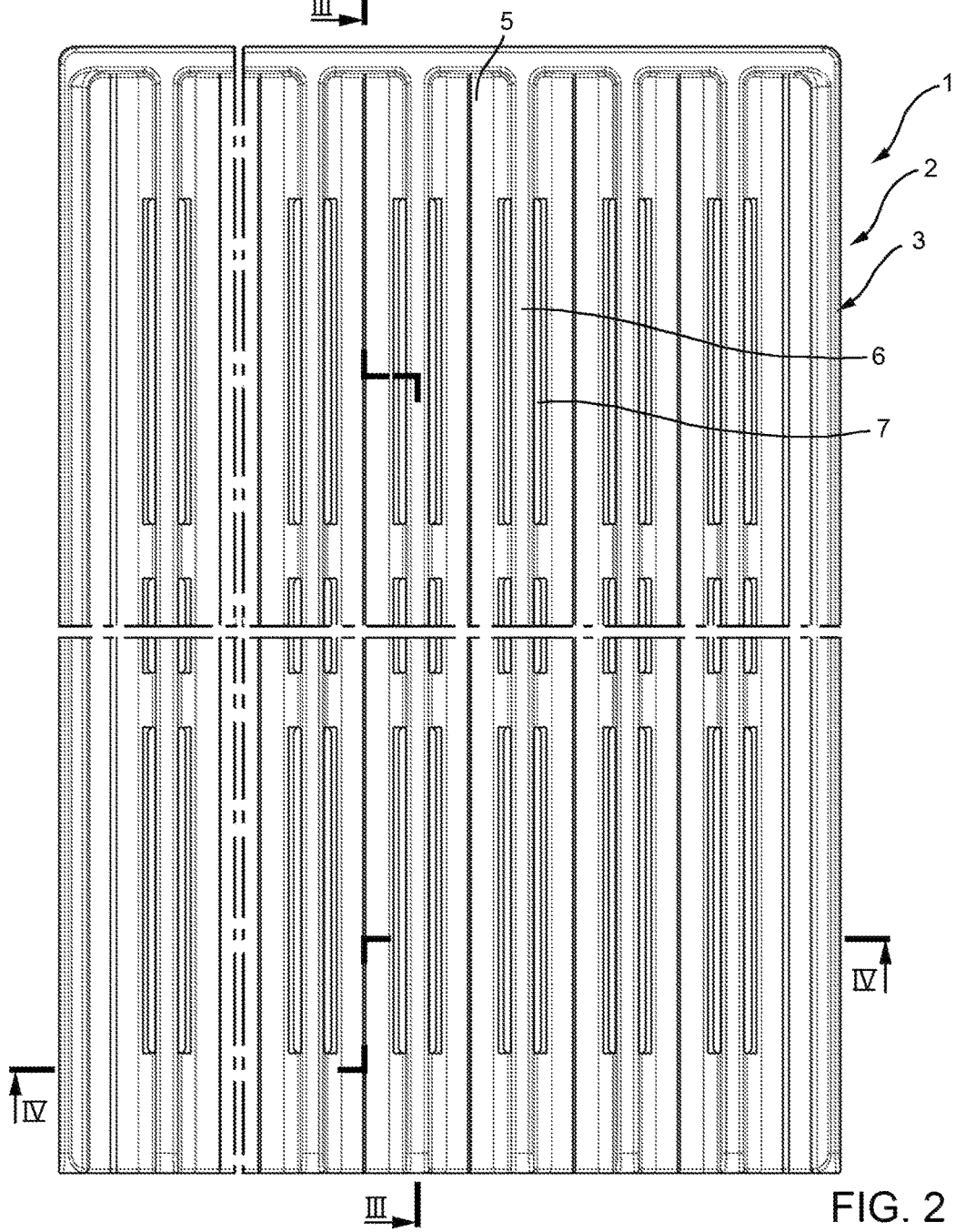

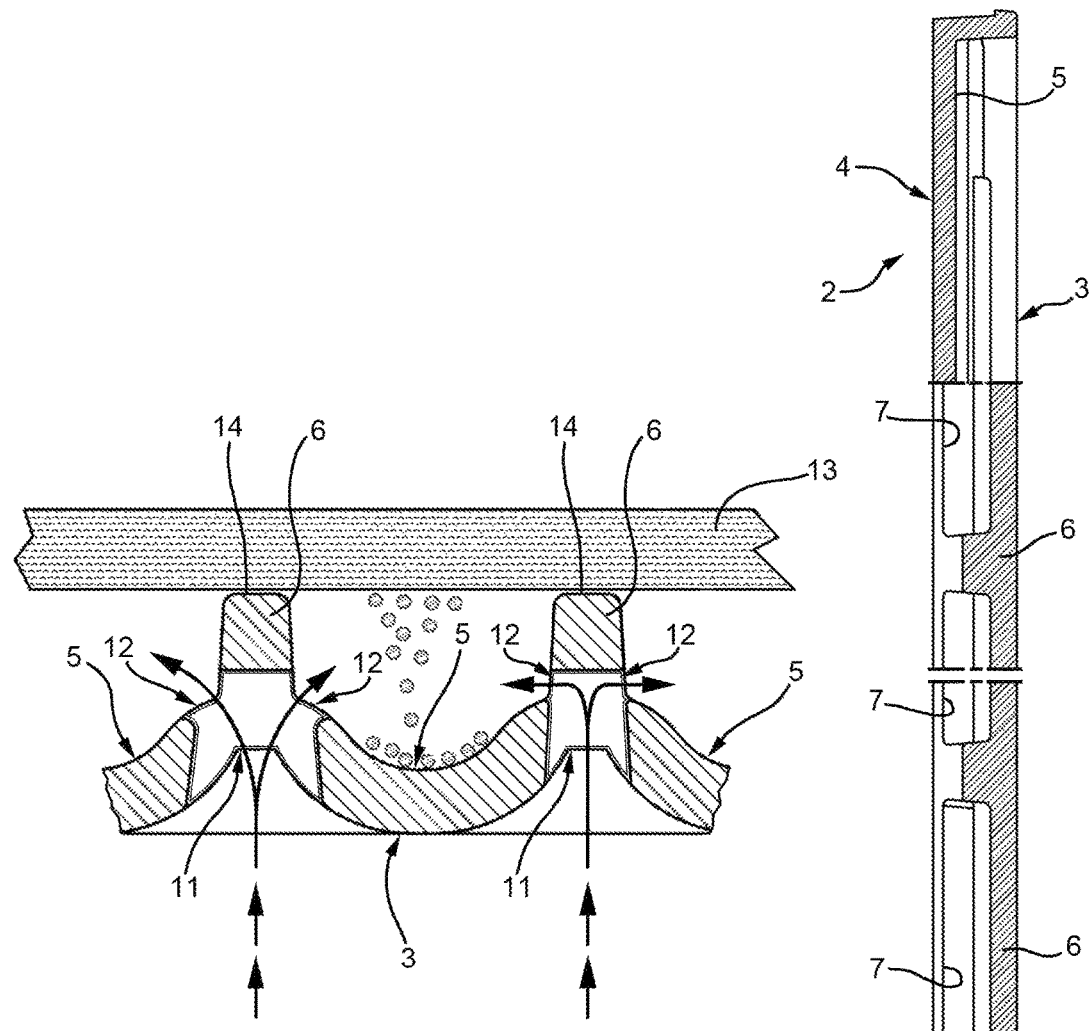

GRID FOR COOKING FOOD

CROSS-REFERENCE TO RELATED APPLICATIONS

This application claims priority from Italian Patent Application No. 102016000038179, filed on Apr. 13, 2016, the disclosure of which is incorporated by reference.

TECHNICAL FIELD

The present invention relates to a grid for cooking food. In particular, the present invention regards a grid for a barbecue.

BACKGROUND

The grid cooking of food requires to arrange the grid over a source of heat resulting from combustion and heating the food via conduction of the heat, transmitted directly between the heated grid and the food, and by convection since the grid is provided with openings for enabling the hot air and the combustion smoke to pass through the grid itself and to lap the food.

As is known, during the grid cooking of food containing fat, part of the fat melts and drips onto the grid. When this happens, the grease that is dripping can pass through the grid and come into direct contact with the source of heat, for example embers, and ignite, thus producing flames that lap the food. It is evident that it is necessary to prevent (or at least limit) the food from coming into direct contact with the flames because it would get burnt and undergo irreparable damage.

In the case where the grid is installed in a gas barbecue, in addition to the risk of generating a flame that damages the food, the grease that drips through the grid dirties the barbecue, which necessarily entails thorough cleaning.

To prevent the above drawbacks, it is today known to provide barriers positioned above the internal port of the openings in such a way as to intercept and deflect the grease that is dripping, which, by gravity, would spontaneously drop into said openings. These barriers may be provided in the form of elements external to the grid, or may directly consist of shaped portions of the grid itself.

The patent application No. WO 2008/125258 describes a solution of the known type in which the grid assembly is formed by two grids arranged on top of one another, where the lower grid has grease-collection channels and openings that separate the adjacent channels, whereas the upper grid has tile-like elements separated by openings and arranged in such a way as to guide into the channels the grease that is dripping. According to this example, the lower grid and the upper grid are arranged on top of one another in such a way that the respective slits of the lower grid are vertically aligned and completely covered by the tile-like elements of the upper grid. Thanks to this arrangement the grease that drips from the upper grid is then collected into the channels of the second, lower, grid, without it possibly dripping into the bottom openings and thus ending up in contact with the heat source. This technical solution on the one hand is certainly efficient, but on the other is costly since it requires the use of two grids instead of just one.

BRIEF SUMMARY

The scope of the present invention is to provide a grid that is inexpensive and that at the same time will manage to ensure effective and safe cooking of food, in terms both of heat conduction and of heat convection, guaranteeing that the grease that drips from the food is properly conveyed into the channels.

According to the present invention, a grid for cooking food is provided, in particular for equipping a barbecue, comprising a plate with an upper face, configured for being set in contact with the food, and a lower face, configured for facing a heat source. The upper face comprises a plurality of channels parallel to one another and configured for conveying liquids, and each channel is separated from the adjacent channel by a partition. A plurality of through openings is provided to enable the hot air and the combustion smoke produced by the heat source to traverse the grid and lap the food. The openings are located at the portions of connection of two adjacent channels with the corresponding partition so as to provide paths for the hot air and combustion smoke, which have an inlet on the under face and two lateral outlets towards two adjacent channels.

In this way, the hot air and the smoke at outlet from the openings have a component of flow directed towards the channels that is such as to intercept the grease that is dripping and to convey it towards the centre of the channels themselves.

In particular, the openings are provided in the form of slits parallel to the channels and, consequently, the partitions provide bridge structures that are parallel to the channels and overlie the corresponding slits.

In this way, the flow of hot air at outlet from the slits is directed homogeneously towards the centre of the channels for the most part of the length of the channels themselves.

In particular, the partitions are substantially vertical, and the lateral outlets of the slits are provided in the first bottom vertical stretch of the partitions.

In this way, the flow of hot air at outlet from the slits will substantially have horizontal components of flow in order to direct more efficiently the grease that is dripping towards the centre of the channels.

In particular, the lateral outlets of the slits can extend underneath beyond the partition and involve also a first stretch of the channels.

In this way, the flow of hot air at outlet from the slits also has a vertical component of flow to increase transmission of the heat by convection of the hot air onto the food.

It should be noted that, even though in this solution apparently the slit is in part exposed to grease dripping from food that is dropping by gravity, this eventuality is avoided by the flow of air at outlet from the slits, which breaks up the drops of grease or in any case orients them towards the remaining central part of the channel.

This innovative solution overcomes a technical prejudice of the known art where it is commonly taught to cover entirely the opening through the slits to prevent passage of the grease.

In particular, the top edge of the partitions of the channels is substantially plane and horizontal.

In this way, a stable resting surface for the food is guaranteed.

BRIEF DESCRIPTION OF THE DRAWINGS

Further characteristics and advantages of the present invention will emerge clearly from the following description of a non-limiting example of embodiment thereof, with reference to the annexed drawings, wherein:

FIG. 2 is a schematic top plan view of the grid of FIG. 1;

FIGS. 3 and 4 are cross-sectional views of FIG. 1 along lines of section B-B and A-A, respectively; and FIG. 5 is an enlarged cross-sectional view of a detail of FIG. 4, which shows two examples of embodiment of the invention.

DETAILED DESCRIPTION

Figure 1:
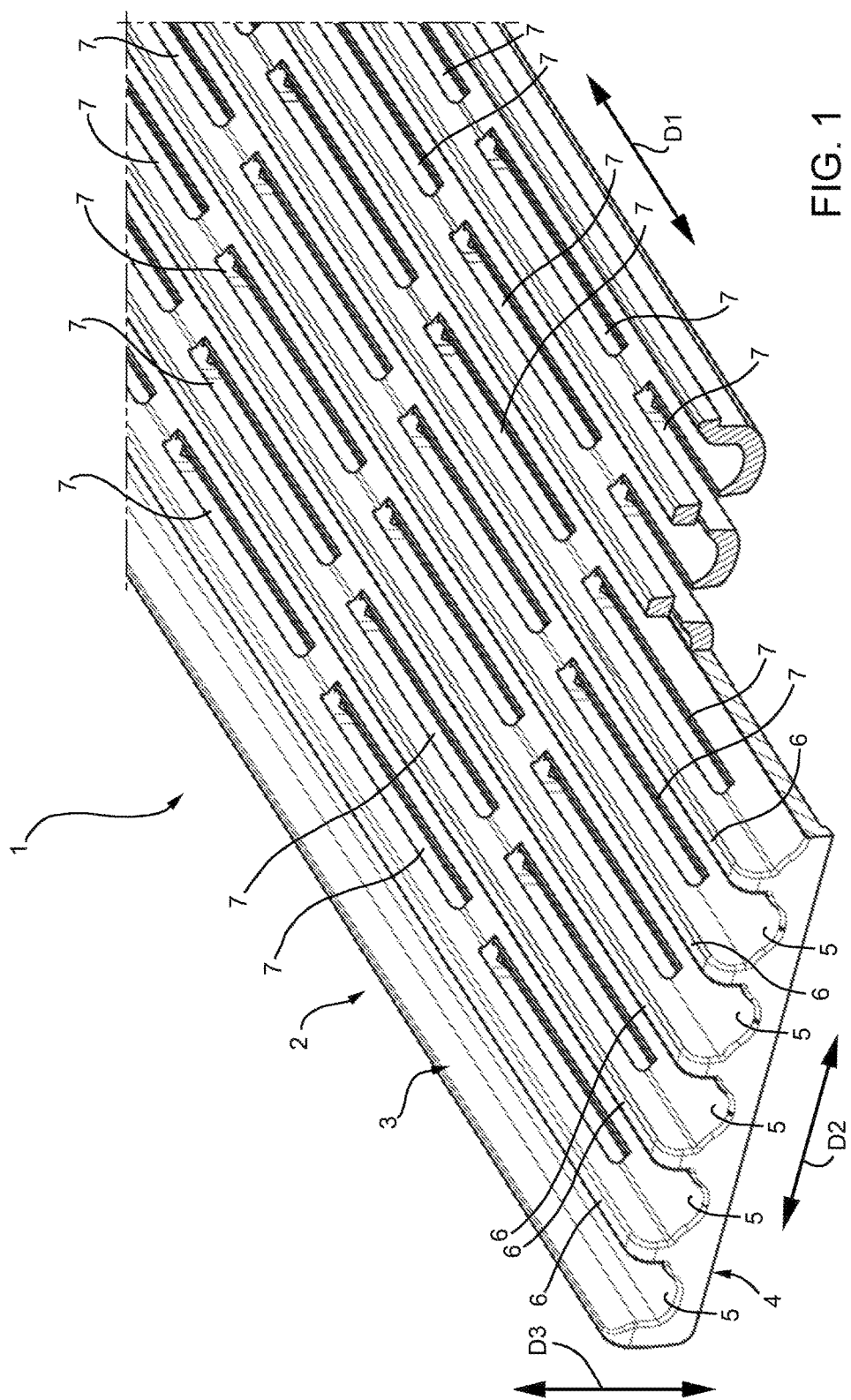
FIG. 1 is a schematic perspective view, with parts in cross section and parts removed for clarity, of a grid for cooking food provided according to the present invention.

In FIG. 1 designated by the reference number 1 is a grid for cooking food realised according to the present invention. Preferably, said grid 1 is realised as a single piece made of cast iron.

In its main use, the grid 1 is associated to a barbecue, not shown, comprising a box-like body on top of which the grid 1 is rested and within which a heat source is housed, typically embers or one or more gas burners.

The grid 1 is supported by the box-like body of the barbecue so as to be slightly inclined with respect to a horizontal plane defined by the ground in order to direct the liquid produced during cooking towards a draining collector.

The plate 2 then has an upper face 3 configured for supporting the food thereon, and an under face 4 configured for facing a heat source, as mentioned above.

With reference to FIG. 1, the upper face 3 of the plate 2 has a plurality of channels 5 parallel to one another in a direction D1, which are configured for conveying liquids, in the present case fat melted by the heat, towards the aforementioned draining collector of the corresponding barbecue.

In the attached figures, the channels 5 have a cross section curved to form a U, but other shapes, such as for example V-shaped sections or equivalent shapes that facilitate conveyance of the liquids towards the centre of the channel, could also be envisaged.

In the illustrated case, each channel 5 is separated from the adjacent channel 5 by a partition 6. Preferably, the partitions 6 are substantially vertical.

The top edges 14 of the partitions 6 are preferably plane and horizontal in such a way as to provide an optimal surface for supporting the food on the upper face 3 of the plate 2. As may be seen in FIG. 4, the partitions 6 are joined at the bottom to the corresponding side channels 5 by means of a connection portion 10.

The plate 2 has a plurality of through openings 7 for enabling the hot air generated by the heat source facing the under face 4 of the plate 2 to reach and lap the food, represented schematically and designated by the reference 13 in FIG. 5, that rests on the upper face 3.

As may be seen in FIG. 4 and in the enlarged details of FIG. 5, the openings 7 are provided precisely at the portions of connection 10 of two adjacent channels 5 with the corresponding partition 6 so as to provide paths for the hot air and combustion smoke that have an inlet 11 on the under face 4, which is substantially horizontal, and two lateral outlets 12 towards the aforesaid two adjacent channels 5.

As may be seen in FIGS. 2 and 3, the openings 7 are provided in the form of slits parallel to the channels 5 and, consequently, the partitions 6 provide bridge structures that are parallel to the channels 5 and overlie the corresponding slits 7.

As may be seen in the right-hand portion in FIG. 5, the lateral outlets 12 of the slits 7 may even be provided only in the first bottom vertical stretch of the partitions 6 in order to generate a substantially horizontal flow at outlet from the slits.

Alternatively, as may be seen in the left-hand portion in FIG. 5, the lateral outlets 12 of the slits 7 may also extend for a first stretch of the channels 5 in order to generate a flow at outlet from the slits that has also a vertical component (direction D3), which can reach the food without any hindrance.

The size of the inlet 11 of the slits on the under face 4 in the direction D2 transverse to the channels 5 may be substantially equal to or greater than the projection of the partition 6, and the ratio between the size of the outlets 12 and the inlet 11 may even be less than one to exploit the Venturi effect and impart a greater speed on the flow of hot air at the outlets 12.

Preferably, extending along each partition 6 are four slits 7 aligned with one another and spaced apart from one another to bestow structural solidity on the grid. The channels 5 are distributed in the direction D2 with a constant distribution pitch.

Preferably, the lateral outlets 12 have a size in the vertical direction D3 that is approximately one third of the height of the plate 2 so as not to create any turbulence in the adjacent channels 5.

Finally, it is evident that modifications and variations may be made to the grid described herein, without thereby departing from the scope of protection of the annexed claims.

What is claimed is:

1. A grid for cooking food, in particular for equipping a barbecue, the grid comprising:
   a plate comprising an upper face configured for being set in contact with food and a lower face configured for facing a heat source;
   the upper face comprising a plurality of channels parallel to one another and configured for conveying liquids, each channel being separated from an adjacent channel by a substantially vertical partition;
   the plate comprising a plurality of openings for enabling hot air and combustion smoke produced by the heat source to lap the food;
   wherein the openings are provided in the form of slits parallel to the channels at portions of connection of two adjacent channels with the corresponding partition so that the partitions form bridges that are parallel to the channels and overlie the slits, the openings defining paths for the hot air and combustion smoke;
   wherein each of the openings comprises an inlet on the lower face and two lateral outlets provided in a bottom vertical portion of the partition that provides a passageway from the inlet to two adjacent channels; and
   wherein the plate is made of a single piece of cast iron.

2. The grid as claimed in claim 1, wherein the lateral outlets of the openings extend along the bottom vertical portion of the partition and a portion of the channels that is adjacent to the partition so that the lateral outlets have a convex portion and a substantially vertical portion.

3. The grid as claimed in claim 2, wherein the lateral outlets have a vertical dimension equal to approximately one third of a height of the plate measured between the top and bottom faces of the plate.

4. The grid as claimed in claim 1, wherein a top edge of the partitions is substantially plane and horizontal.

5. The grid as claimed in claim 1, wherein each slit has a length smaller than a length of the plate.

6. The grid as claimed in claim 1, wherein extending along each partition are four slits aligned with one another and spaced apart from one another.

7. The grid as claimed in claim 1, wherein the channels are distributed in a direction transverse to the direction of extension of the channels themselves with a constant distribution pitch.

8. The grid as claimed in claim 1, wherein each of the openings has a height measured from the lower face of the plate to a bottom end of the partition and wherein each of the projections comprises a bridge portion having a height measured from the opening to a top end of the partition, the height of the inlet being substantially equal to or greater than the height of the bridge portion of the partition.

9. The grid as claimed in claim 1, wherein each of the partitions is joined to two adjacent channels by a connection portion, and wherein the openings are located at the connection portion.

10. The grid as claimed in claim 1 wherein each of the partitions has a quadrilateral shape.

11. The grid as claimed in claim 1 wherein the lower face of the plate comprises a plurality of U-shaped sections that are positioned side-by-side, and wherein the inlet of each of the openings is located at a position where two of the U-shaped sections that are adjacent to one another intersect.

12. The grid as claimed in claim 1 wherein the lower face of the plate comprises a plurality of concave portions, and wherein the inlet of each of the openings overlaps with an apex of one of the concave portions.

13. The grid as claimed in claim 1 wherein each of the partitions is a solid, non-hollow wall that is located between two adjacently positioned channels.

14. The grid as claimed in claim 1 wherein the upper face of the plate comprises a plurality of concave portions and a plurality of convex portions positioned in a side-by-side arrangement, and wherein each of the partitions extends from an apex of one of the convex portions of the upper face.

15. A grid for cooking food on a barbecue, the grid comprising:
  a plate comprising an upper face configured for being set in contact with food and a lower face configured for facing a heat source;
  the upper face comprising a plurality of channels that are parallel to one another in a first direction, each channel comprising a floor that extends from a first end to a second end in a second direction that is transverse to the first direction so that a second end of the floor of each channel is adjacent to the first end of the floor of an adjacent channel;
  each channel being separated from the adjacent channel by a partition that extends from the second end of the floor of the channel to the first end of the floor of the adjacent channel, each partition comprising a lower portion and a top edge that supports the food;
  a plurality of openings for enabling hot air and the combustion smoke produced by the heat source to lap the food, each of the openings comprising an inlet in the lower face of the plate, a first outlet in the lower portion of the partition that provides a first passageway from the inlet to a first one of the channels on a first side of the partition, and a second outlet in the lower portion of the partition that provides a second passageway from the inlet to a second one of the channels on a second side of the partition; and
  wherein the plate is made of a single piece of cast iron.

16. The grid as claimed in claim 14 wherein the floor of each channel comprises a U-shaped transverse cross-sectional shape.

17. The grid as claimed in claim 14 wherein each of the partitions is a solid, non-hollow wall having a quadrangular transverse cross-sectional shape.

18. A grid for cooking food on a barbecue, the grid comprising:
  a plate comprising an upper face configured for being set in contact with food and a lower face configured for facing a heat source;
  the upper face comprising a plurality of concave portions and a plurality of convex portions, each of the concave portions forming a channel that is configured for conveying liquids;
  a partition extending from an apex of each of the convex portions to separate each channel from an adjacent channel;
  each of the partitions comprising a first surface that faces a first channel on a first side of the partition, a second surface that faces a second channel on a second side of the partition, and a top edge extending between the first and second surfaces at a distal end of the partition, the partition forming a solid, non-hollow wall positioned between two adjacent ones of the channels; and
  each of the partitions comprising at least one opening for enabling hot air and combustion smoke produced by the heat source to lap the food that is supported by the top edges of the partitions, each of the openings forming a passageway through the partition from the first surface of the partition to the second surface of the partition and having an inlet in the lower face of the plate.

19. A grid as claimed in claim 18 wherein a reference plane that is parallel to the top edges of the partitions exists that extends through the partition from the first surface to the second surface without intersecting the opening.

20. The grid as claimed in claim 18 wherein the top edges of the partitions are substantially horizontal and the first and second surfaces of the partitions are substantially vertical.

* * * * *